3,389,051
METHOD FOR REDUCING CHOLESTEROL IN THE BODY

Fred Kagan, Kalamazoo, Mich., assignor to The Upjohn Company, Kalamazoo, Mich., a corporation of Delaware
No Drawing. Continuation of application Ser. No. 81,269, Jan. 9, 1961. This application Aug. 15, 1966, Ser. No. 572,627
2 Claims. (Cl. 167—65)

This application is a continuation of my earlier application Ser. No. 81,269, filed Jan. 9, 1961, now abandoned.

This invention relates to hypocholesteremic compositions and, more particularly, to compositions containing as the principal active ingredients certain 3β-(dialkylaminoalkoxy)-5-androsten-17-ones, 3β-(dialkylaminoalkoxy)-5α-androstan-17-ones, 3β - (dialkylaminoalkoxy)-5-androsten-17-one N-oxides, 3β - (dialkylaminoalkoxy)-5α-androstan-17-one N-oxides and the physiologically acceptable acid addition salts thereof.

The said principal active ingredients can be represented by the following formulas:

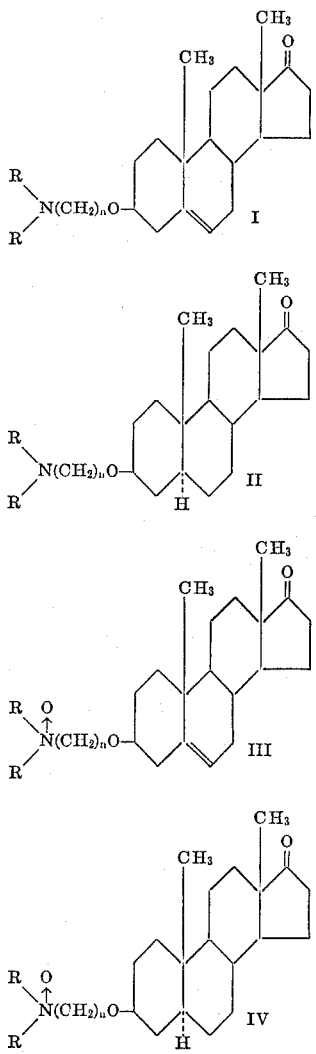

wherein R is an alkyl group of less than 4 carbon atoms and n is an integer of 2 through 6, and the physiologically acceptable acid addition salts thereof. Representative of the compounds contemplated herein are 3β-(diethylaminoethoxy)-5-androsten - 17 - one, 3β-(diethylaminoethoxy)-5α-androstan-17-one, 3β-(diethylaminopropoxy)-5-androsten-17-one, 3β - (dimethylaminoethoxy)-5-androsten-17-one, 3β-(diethylaminoethoxy) - 5 - androsten - 17 - one N-oxide, 3β - (diethylaminoethoxy) - 5α - androstan-17-one N-oxide, 3β-(diethylaminobutoxy) - 5 - androsten-17-one, 3β-(dipropylaminopentoxy)-5α-androstan,17-one and 3β - (dibutylaminohexyloxy)-5-androsten-17-one N-oxide, and the acid addition salts of such compounds, these including the preferred corresponding hydrochlorides, as well as the hydrobromides, sulfates, nitrates, phosphates, benzoates, p-toluenesulfonates, salicylates, acetates, propionates, tartrates, citrates, succinates and the like.

Atherosclerosis is a form of arteriosclerosis characterized by fatty degeneration occurring in the arterial walls, although the underlying mechanism has not been definitively established. It has been observed, however, that hypercholesteremia is a common finding in human subjects with atherosclerosis. Hypercholesteremia refers essentially to an excess of cholesterol in the blood serum. While the causes of hypercholesteremia and the nature of its role in atherosclerosis and related conditions is not clearly understood, considerable effort has been directed toward reducing blood and tissue cholesterol levels as an attack on the clinical conditions in which high levels are implicated. It has long been recognized that certain substances such sitosterol, corn oil, and nicotinic acid are capable of reducing in small degree the blood and tissue cholesterol contents, either by interfering with the absorption of exogenous cholesterol introduced with food, or by in some manner facilitating the excretion of cholesterol from the body. Major emphasis, however, has been placed on the search for compounds which will interfere with the production of endogenous cholesterol by the liver and hence offer a more positive means of control of cholesterol levels.

It has now been found that compositions containing the principal active ingredients as described herein are capable of significantly reducing the cholesterol content of both blood and tissue by partially arresting the biosynthesis of cholesterol in the body. Careful studies with representative hypocholesteremic agents comprising the principal active ingredients hereof in rats and dogs have established that blood cholesterol can be reduced as much as 65% by administration of such compounds.

The principal active ingredients hereof can be prepared by the following procedure or obvious modifications thereof, the amounts specified being only for general guidance:

A mixture of 0.35 mole of the 3-hydroxy-17-keto steroid, 100 ml. of ethylene glycol, 1500 ml. of benzene and 2.0 gm. of p-toluenesulfonic acid are heated at reflux for 5 hours. Water is removed from the refluxing reaction mixture by use of a Dean-Stark water trap. The reaction mixture is cooled to 30° C., washed with 200 ml. of 5% potassium bicarbonate solution, dried over anhydrous sodium sulfate, and, finally, 200 ml. of benzene is distilled to complete the drying process. To the dry benzene solution is added 0.37 mole of butyl lithium in hexane followed in 15 minutes by 0.38 mole of the dialkylaminoalkyl chloride. The reaction mixture is heated at reflux temperature for 24 hours, cooled to 25° C., diluted with 1 liter of ether and extracted with three 800-ml. portions of dilute hydrochloric acid (80 ml. of 37% hydrochloric acid diluted to 800 ml.). The aqueous extract is washed once with 800 ml. of ether. Combination drying and evaporation of the organic extracts yields about 0.12 mole of unreacted 3-hydroxy-17-keto steroid. The aqueous acidic phase is extracted with three 500-ml. portions of methylene dichloride. These extracts are combined, dried, and evaporated and the residue recrystallized from acetone to give essentially pure 3β-(dialkylaminoalkoxy)-5- androsten-17-one hydrochloride or the corresponding 5α-androstane product, depending on the starting steroid. The free base is obtainable by neutralizing the acid salt and purifying in conventional manner. Catalytic hydrogenation by the usual procedure converts a 5-androstene free base or acid salt to the corresponding 5α-androstane product. The N-oxides of either the 5-androstene or 5α-androstane steroids are produced by oxidizing the free amine with hydrogen peroxide by known methods. Starting with the free base of any of the foregoing compounds the desired acid addition salts as hereinbefore described can be prepared by contacting the said free base with the appropriate acid and purifying the product by conventional means.

It is to be understood that the foregoing is merely an outline of general methods for preparing the present active ingredients. Those skilled in the art will adapt this procedure as required for the preparation of specific compounds. The application of the above procedure to the preparation of representative compounds is illustrated below.

PREPARATION 1

*3β-(diethylaminoethoxy)-5-androsten-17-one hydrochloride*

A mixture of 100 gm. of dehydroepiandrosterone, 100 ml. of ethylene glycol, 1,500 ml. of benzene and 2 gm. of p-toluene-sulfonic acid were heated under reflux using a Dean-Stark separator for 5 hours. The reaction mixture was cooled to 30° C. and washed with 200 ml. of 5% potassium bicarbonate solution. The solution was dried over sodium sulfate, and 200 ml. of benzene was distilled to complete the drying process. To the residue was added 0.37 mole of butyl lithium in hexane, followed by 0.38 mole of diethylaminoethyl chloride dissolved in toluene. The reaction mixture was heated under reflux for 23 hours. The mixture was cooled, diluted with 1 l. of ether, and extracted with three successive 800-ml. portions of dilute hydrochloric acid (80 ml. of concentrated hydrochloric acid diluted to 800 ml.). The aqueous extract was washed with 800 ml. of ether and then extracted with 800-ml., 400-ml., and 400-ml. portions of methylene dichloride. The combined extracts were dried and concentrated. The residue was dissolved in a minimum of methylene dichloride and added to 2 l. of ether. The precipitate was collected by filtration, washed with ether and dried to give 79 gm. of 3β-(diethylaminoethoxy)-5-androsten-17-one hydrochloride, M.P. 197–201° C.

PREPARATION 2

*3β-(diethylaminoethoxy)-5-androsten-17-one N-oxide hydrochloride*

To a solution of 3.5 gm. (0.00825 mole) of 3β-(diethylaminoethoxy)-5-androsten-17-one hydrochloride dissolved in 20 ml. of methanol was added 10 ml. of 5% solution of sodium hydroxide in methanol. After swirling for 5 minutes the mixture was filtered and the filtrate evaporated to dryness under vacuum. The residue was dissolved in 100 ml. of methylene dichloride which was then washed with three 25-ml. portions of water. The methylene dichloride phase was filtered and evaporated to dryness under vacuum to give 2.34 gm. of 3β-(diethylaminoethoxy)-5-androsten-17-one. This was dissolved in 10 ml. of ethanol, cooled in an ice bath and 5 ml. of 30% hydrogen peroxide solution added. After standing at about 25° C. for 18 hours the excess hydrogen peroxide was destroyed by portion-wise addition of 500 mg. of platinum oxide catalyst. Filtration and evaporation of the filtrate gave a white solid which was dissolved in ether. Hydrogen chloride gas was bubbled into this solution and the white solid which precipitated was collected, dried, and recrystallized from acetone to give 3β-(diethylaminoethoxy)-5-androsten-17-one N-oxide hydrochloride, M.P. 156–159° C., having the following analysis:

*Analysis.*—Calcd. for $C_{24}H_{42}ClNO_3$: C, 68.23; H, 9.62; N, 3.18; Cl, 8.06. Found: C, 68.29; H, 9.78; N, 3.27; Cl, 8.16.

PREPARATION 3

*3β-(diethylaminoethoxy)-5α-androstan-17-one hydrochloride monohydrate*

A solution of 1.1 gm. (0.00236 mole) of 3β-(diethylaminoethoxy)-5-androsten-17-one hydrochloride in 200 ml. of methanol was charged to a Parr Hydrogenator (30 to 50 p.s.i. hydrogen) using about 1.0 gm. of 5% palladium on carbon as the reduction catalyst. After one hour the theoretical amount of hydrogen had been taken up. The reaction solution was filtered to remove the catalyst and the filtrate evaporated to dryness. The solid residue was recrystallized four times from a mixture of acetone-Skellysolve B (hexane hydrocarbons) to give 500 mg. of 3β-(diethylaminoethoxy)-5α-androstan-17-one hydrochloride monohydrate, M.P. 164–165° C., having the following analysis:

*Analysis.*—Calcd. for $C_{25}H_{43}NO_2 \cdot HCl \cdot H_2O$: C, 67.76; H, 10.24; N, 3.16; Cl, 8.00. Found: C, 67.81; H, 10.12; N, 3.29; Cl, 8.17.

The dosage of the principal active ingredients of these compositions in humans and animals must be determined individually according to the subject's age, weight, response to the medication, severity of the condition being treated and route of administration. Single doses of between about 1 and about 250 mg. of active ingredient are administered as indicated, preferably from about 5 to about 150 mg. one to four times daily. As with all new therapeutic compositions, however, administration to humans should be only under the supervision of a physician. In adapting the present compositions to veterinary practice the dosage should be adjusted on an approximate weight ratio basis.

In addition to the foregoing compounds as sole active ingredients, other complementary ingredients can be included to secure advantageous combinations of properties specially adapted to individual situations. Such combinations include in each dosage unit conventional therapeutic amounts or less of other hypocholesteremic agents such as triparanol, the D-isomer of 3,5,3'-triiodothyronine, and thyroxine-like compounds such as sodium L-thyroxine and sodium D-thyroxine; glucocorticoids such as hydrocortisone, prednisolone and 6α-methylprednisolone; anticoagulants such as heparin, 2-diphenylacetyl-1,3-indandione; polyethylenesulfonate and dicoumarol or its derivatives; vitamins such as nicotinic acid, vitamin $B_{12}$ and pyridoxine hydrochloride; estrogens such as estradiol; androgens such as testosterone; combinations of estrogens and androgens such as estradiol and testosterone; unsaturated fatty acids or esters such as corn oil and linoleic acid or esters; antibiotics such as neomycin; analgesics such as aspirin; compounds associated with cholesterol synthesis or metabolism such as α-phenylbutyric acid and α-p-biphenylylbutyric acid; lipotrophic agents such as choline and inositol; amino acids such as taurine and glycine; sterols such as sitosterol and other plant sterols, diuretics such as acetazolamide and chlorothiazide; anorexigenic agents such as amphetamine; cardiovascular agents (including vasodilators and hypotensive agents), such as chlorisodamine chloride, hexamethonium chloride, and pentaerythritol tetranitrate. In general, the amounts of such supplementary active ingredients incorporated in the unit doses of the compositions hereof should not exceed the normal single dose amounts associated with such agents.

In adapting the active ingredients for use in mammals and birds, the novel compositions are suitably presented for administration in unit dosage form as tablets, pills, capsules, powders, wafers, cachets, granules, sterile parenteral solutions or suspensions in aqueous or oil vehicles, oral aqueous or oil dispersions, including syrups and elixirs, and the like.

For preparing solid compositions such as tablets, the active ingredient is mixed with a conventional tableting component such as cornstarch, lactose, dicalcium phosphate, talc, stearic acid, calcium stearate, gums, and functionally similar materials constituting pharmaceutical diluents or carriers. The tablets or pills can be laminated or otherwise compounded to provide a dosage form affording the advantage of prolonged or delayed action or of predetermined successive action of the enclosed medication. For example, the tablet or pill can comprise an inner dosage and outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate phthalate (as described in U.S. Patent No. 2,196,768) and the like. A particularly advantageous enteric coating comprises a styrene maleic acid copolymer together with known materials contributing to the enteric properties of the coating.

The liquid form in which the novel compositions of this invention can be incorporated include aqueous solutions, suitable flavored syrups, suspensions, emulsions or suspensions with edible oils such a cottonseed oil, sesame oil, coconut oil, peanut oil and the like, as well as elixirs and similar pharmaceutical vehicles. Suitable dispersing or suspending agents for aqueous suspensions include the synthetic and natural gums such as tragacanth, acacia, alginate, dextran, methylcellulose, polyvinylpyrrolidone, gelatin and the like.

For injectable solutions or suspensions, conventional preservatives, buffers, isotonic agents and suspending agents are advantageously employed. Suitable preservatives include chlorobutanol, myristyl gamma picolinium chloride, benzyl alcohol, the methyl- and propylparabens, and sodium ethyl mercurithiosalicylate. Potassium chloride is preferred as an isotonic agent. Among the suspending agents which are suitable for present purposes are polyethylene glycol 4000 or 6000, polyvinylpyrrolidone, dextran, methylcellulose, and surfactants such as polysorbate 80.

The term "unit dosage form" as used in the specification and claims herein refers to physically discrete units suitable as unitary dosages for human subjects, each unit containing a predetermined quantity of active material calculated to produce the desired therapeutic effect in association with the required pharmaceutical diluent, carrier or vehicle. The specification for the novel unit dosage forms of this invention are dictated by and directly dependent on (a) the unique characteristics of the active material and the particular therapeutic effect to be achieved and (b) the limitations inherent in the art of compounding such an active material for therapeutic use in humans, as disclosed in detail in this specification, these being features of the present invention. Examples of suitable unit dosage forms, as heretofore described, are tablets, capsules, pills, powder packets, wafers, cachets, teaspoonfuls, tablespoonfuls, dropperfuls, ampules, vials and segregated multiples of any of the foregoing, and other forms alluded to herein.

The following examples illustrate the best mode contemplated by the inventor for carrying out the invention but are not to be construed as limiting the scope thereof.

EXAMPLE 1

*Compressed tablets*

A lot of 10,000 compressed tablets, each containing 5 mg. of 3β-(diethylaminoethoxy)-5-androsten-17-one hydrochloride is prepared from the following ingredients:

| | Gm. |
|---|---|
| 3β-(diethylaminoethoxy)-5 - androsten - 17 - one hydrochloride | 100 |
| Dicalcium phosphate | 2,500 |
| Methylcellulose, USP (15 cps.) | 65 |
| Talc, bolted | 450 |
| Calcium stearate, fine powder | 35 |

The 3β-(diethylaminoethoxy)-5-androsten-17 - one hydrochloride and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of hypercholesteremia in adult humans.

EXAMPLE 2

*Compressed tablets*

Following the procedure of Example 1 but employing 1,500 gm. of active ingredient, compressed tablets, each containing 150 mg. of 3β-(diethylaminoethoxy)-5-androsten-17-one hydrochloride are prepared.

One tablet is used four times a day in treatment of hypercholesteremia in adult humans.

EXAMPLE 3

*Hard gelatin capsules*

A lot of 1,000 hard gelatin capsules, each containing 1 mg. of 3β-(diethylaminopropoxy)-5-androsten-17-one N-oxide hydrochloride is prepared from the following ingredients:

| | Gm. |
|---|---|
| 3β - (diethylaminopropoxy) - 5-androsten-17-one N-oxide hydrochloride | 1 |
| Starch, dried | 150 |
| Calcium stearate | 2 |
| Talc | 3 |

The starch, talc and stearate are mixed well and the 3β-(diethylaminopropoxy)-5-androsten-17-one N-oxide hydrochloride incorporated into the mixture. The whole is mixed well and filled into two-piece hard gelatin capsules.

The capsules are used in the reduction of cholesterol levels in adult humans at a dose of 3–6 capsules daily.

EXAMPLE 4

*Hard gelatin capsules*

Following the procedure of Example 3 but employing 250 gm. of active ingredient and reducing the amount of starch to 30 gm., hard gelatin capsules each containing 250 mg. of 3β-(diethylaminoethoxy)-5-androsten-17-one N-oxide hydrochloride.

One capsule daily is used in the management of hypercholesteremia in adult humans.

EXAMPLE 5

*Soft gelatin capsules*

A batch of 1,000 soft gelatin capsules, each containing 50 mg. of 3β-(diethylaminoethoxy)-5α-androstan-17-one hydrochloride and corn oil is prepared from the following materials:

| | |
|---|---|
| 3β-(diethylaminoethoxy)-5α-androstan-17-one hydrochloride gm | 50 |
| Corn oil, q.s. | |

A uniform dispersion of the active ingredient in the corn oil is prepared and the dispersion filled into soft gelatin capsules by conventional means.

One capsule is given twice a day in the treatment of hypercholesteremia in adult humans.

EXAMPLE 6

Aqueous oral suspension

An aqueous oral suspension containing in each 5 ml. 100 mg. of 3β-(diethylaminoethoxy)-5-androsten-17-one is prepared from the following materials:

| | |
|---|---:|
| 3β - (diethylaminoethoxy) - 5 - androsten-17-one, powder _____gm__ | 200 |
| Methylparaben USP _____gm__ | 7.5 |
| Propylparaben USP _____gm__ | 2.5 |
| Saccharin sodium _____gm__ | 12.5 |
| Cyclamate sodium _____gm__ | 2.5 |
| Glycerin _____ml__ | 3,000 |
| Tragacanth powder _____gm__ | 100 |
| Orange oil flavor _____gm__ | 10 |
| F. D. and C. orange dye _____gm__ | 7.5 |
| Deionized water, q.s. to _____ml__ | 10,000 |

One teaspoonful (5 ml.) daily is employed in the treatment of hypercholesteremia in adult humans.

EXAMPLE 7

Aqueous suspension for injection

A suspending vehicle is prepared from the following materials:

| | |
|---|---:|
| Polyethylene glycol 4000 _____gm__ | 30 |
| Potassium chloride _____gm__ | 11.2 |
| Polysorbate 80 _____gm__ | 2 |
| Methylparaben _____gm__ | 1.8 |
| Propylparaben _____gm__ | 0.2 |
| Water for injection, q.s. _____ml__ | 1,000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 3β-(diethylaminoethoxy)-5α-androstan-17-one which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 3β-(diethylaminoethoxy)-5α-androstan-17-one. The suspension is used intramuscularly in 1-ml. doses in the treatment of hypercholesteremia.

EXAMPLE 8

Compressed tablets

A lot of 10,000 tablets for oral use, each containing 100 mg. of 3β-(diethylaminoethoxy)-5-androsten-17-one hydrochloride and 0.4 mg. of thyroxine, is prepared from the following materials:

| | Gm. |
|---|---:|
| 3β - (diethylaminoethoxy) - 5 - androsten - 17 - one hydrochloride _____ | 1,000 |
| Thyroxine _____ | 4 |
| Dibasic calcium phosphate _____ | 600 |
| Talc _____ | 150 |
| Methylcellulose USP (15 cps.) _____ | 175 |
| Starch _____ | 375 |
| Magnesium stearate _____ | 10 |

All of the ingredients, except the last two, are mixed well and granulated with water. To the dried granules is added the lubrication mixture of starch and stearate, and the mixture is then compressed into tablets.

One tablet twice a day is used in the treatment of hypercholesteremia.

Similarly substituting from about 2,500 to about 30,000 gm. of nicotinic acid for the thyroxine above gives tablets containing from about 0.25 to about 3 gm. of nicotinic acid in synergistic combination with the primary active ingredient. Administration is on the same dosage schedule.

EXAMPLE 9

For the principal active ingredients of Examples 1 through 8 there can be substituted equal amounts of other 3β-(dialkylaminoalkoxy)-5-androsten-17-ones,
3β-(dialkylaminoalkoxy)-5α-androstan-17-ones,
3β-(dialkylaminoalkoxy)-5-androsten-17-one N-oxides, and
3β-(dialkylaminoalkoxy)-5α-androstan-17-one N-oxides, in which the dialkylaminoalkoxy groups conform to the formula:

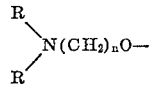

wherein R is an alkyl group of less than 4 carbon atoms and $n$ is an integer of 2 through 6, as well as the acid addition salts of the foregoing compounds, such as the hydrochlorides, hydrobromides, sulfates, nitrates, phosphates, benzoates, p-toluenesulfonates, salicylates, acetates, propionates tartrates, citrates, succinates, and the like. Representative of the compounds that can be substituted in equal amounts for the principal active ingredients in said Examples 1 through 8 are 3β-(diethylaminoethoxy)-5-androsten-17-one hydrochloride,
3β-(diethylaminoethoxy)-5α-androstan-17-one hydrochloride,
3β-(diethylaminopropoxy)-5-androsten-17-one hydrochloride,
3β-(dimethylaminoethoxy)-5-androsten-17-one hydrochloride,
3β-(diethylaminoethoxy)-5-androsten-17-one N-oxide hydrochloride,
3β-(diethylaminoethoxy)-5α-androstan-17-one N-oxide hydrochloride,
3β-(dimethylaminobutoxy)-5α-androstan-17-one hydrobromide,
3β-(dipropylaminoethoxy)-5-androsten-17-one sulfate,
3β-(dibutylaminohexyloxy)-5α-androstan-17-one succinate, other acid addition salts thereof and the corresponding free bases. Administration of the resulting compositions is on the same schedules indicated in said Examples 1 through 8.

What is claimed is:

1. A method for reducing the cholesterol content of both blood and tissue in mammals by partially arresting the biosynthesis of cholesterol in the body which comprises: orally administering between about 1 and about 250 mg. of 3β-(diethylaminoethoxy)-5-androsten-17-one or a physiologically acceptable acid addition salt thereof to a mammal.

2. A method for reducing the cholesterol content of both blood and tissue in mammals by partially arresting the biosynthesis of cholesterol in the body which comprises: orally administering to a mammal between about 1 and about 250 mg. of 3β-(dialkylaminoethoxy)-5-androsten-17-one, wherein the alkyl group is methyl or ethyl, or a physiologically acceptable acid addition salt thereof.

References Cited

UNITED STATES PATENTS 3,206,457   9/1965   Marshall _____ 269—239.5

ALBERT T. MEYERS, *Primary Examiner.*

SAM S. ROSEN, *Examiner.*